United States Patent
Tani et al.

(10) Patent No.: US 10,025,999 B2
(45) Date of Patent: Jul. 17, 2018

(54) BRIGHTNESS RANGE BASED OBSTACLE DETECTION APPARATUS AND METHOD

(71) Applicant: FUJITSU TEN LIMITED, Kobe-shi, Hyogo (JP)

(72) Inventors: Yasushi Tani, Kobe (JP); Jyunji Hashimoto, Kobe (JP); Tomohide Kasame, Kobe (JP); Naoshi Kakita, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 86 days.

(21) Appl. No.: 15/009,915

(22) Filed: Jan. 29, 2016

(65) Prior Publication Data
US 2016/0259983 A1    Sep. 8, 2016

(30) Foreign Application Priority Data

Mar. 6, 2015    (JP) .................................. 2015-045019

(51) Int. Cl.
| | |
|---|---|
| *G06T 7/00* | (2017.01) |
| *G06T 5/00* | (2006.01) |
| *G06K 9/00* | (2006.01) |
| *G06K 9/46* | (2006.01) |

(52) U.S. Cl.
CPC ....... *G06K 9/00805* (2013.01); *G06K 9/4647* (2013.01)

(58) Field of Classification Search
CPC .......................... G06K 9/00805; G06K 9/4647
See application file for complete search history.

(56) References Cited

U.S. PATENT DOCUMENTS

| | | | | |
|---|---|---|---|---|
| 2002/0159616 A1* | 10/2002 | Ohta | .................. | G06K 9/00798 382/104 |
| 2004/0057599 A1* | 3/2004 | Okada | ..................... | G06T 7/248 382/103 |
| 2005/0196034 A1* | 9/2005 | Hattori | ..................... | B60R 1/00 382/154 |
| 2008/0195284 A1* | 8/2008 | Hammadou | .......... | B60Q 9/006 701/45 |
| 2008/0309516 A1* | 12/2008 | Friedrichs | ............... | G06T 7/223 340/935 |
| 2012/0294481 A1* | 11/2012 | Kasaoki | ............. | G06K 9/00805 382/103 |
| 2012/0294485 A1* | 11/2012 | Kasaoki | ............. | G06K 9/00805 382/103 |
| 2018/0046868 A1* | 2/2018 | Lin | ........................... | G06T 7/74 |
| 2018/0060679 A1* | 3/2018 | Park, II | ............. | G06K 9/00805 |

FOREIGN PATENT DOCUMENTS

JP    2009-025910 A    2/2009

* cited by examiner

*Primary Examiner* — Sean Conner
*Assistant Examiner* — Pinalben Patel
(74) *Attorney, Agent, or Firm* — Oliff PLC

(57) ABSTRACT

An obstacle detection apparatus according to an embodiment includes an on-vehicle camera (image capturing unit), an estimation unit, and a determination unit. The on-vehicle camera is provided on a vehicle and captures an image of surroundings of the vehicle. The estimation unit estimates an existence region with an obstacle existing therein in an image captured by the image capturing unit. The determination unit determines presence or absence of the obstacle based on brightness of the existence region.

2 Claims, 9 Drawing Sheets

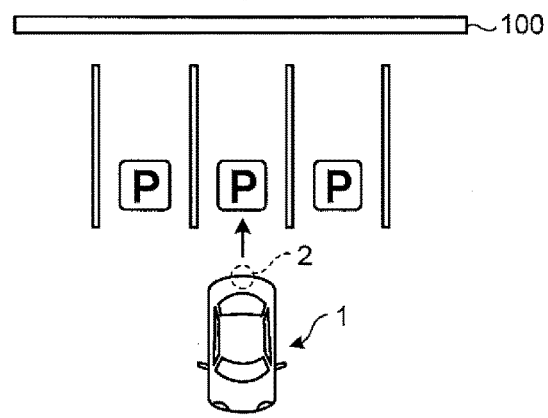
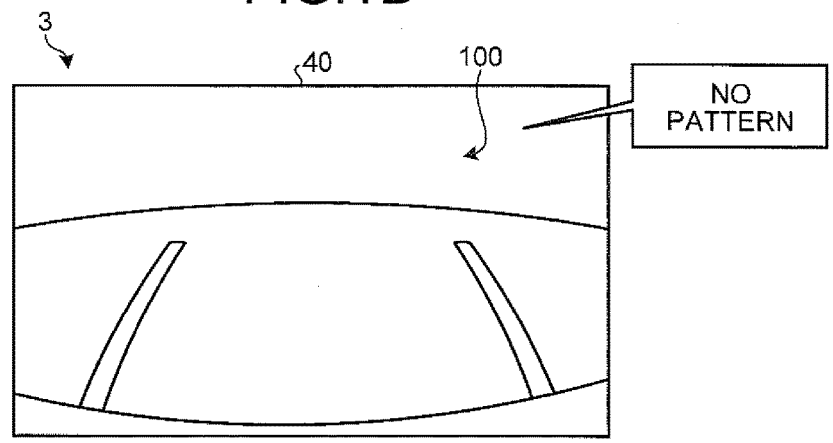
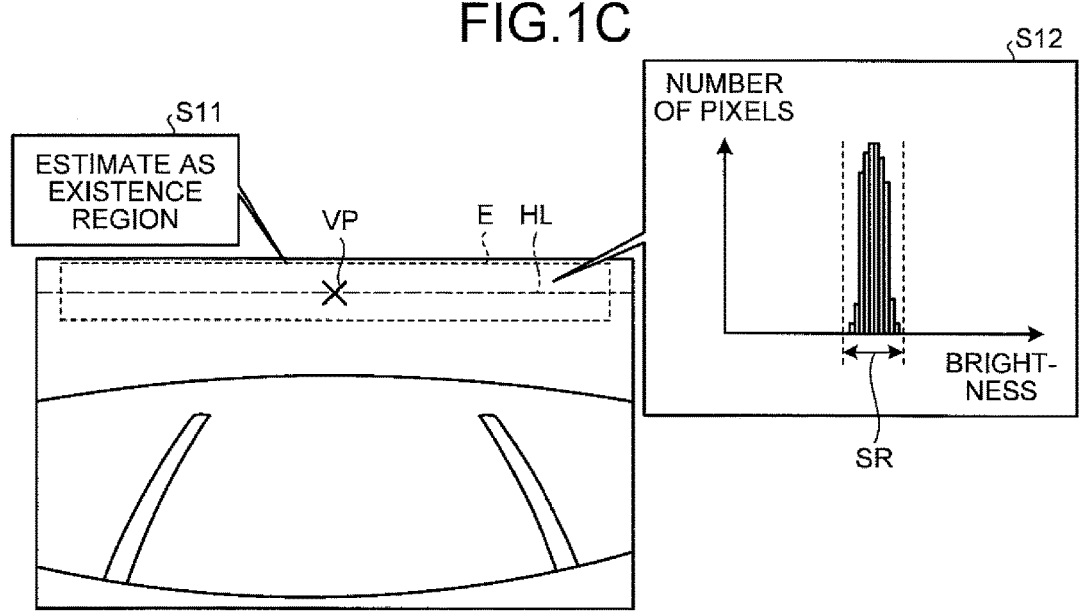

BRIGHTNESS RANGE BASED OBSTACLE DETECTION APPARATUS AND METHOD

CROSS-REFERENCE TO RELATED APPLICATION

This application is based upon and claims the benefit of priority of the prior Japanese Patent Application No. 2015-045019, filed on Mar. 6, 2015, the entire contents of which are incorporated herein by reference.

FIELD

The embodiments discussed herein are directed to an obstacle detection apparatus and an obstacle detection method.

BACKGROUND

Conventionally, a technique has been known that captures an image of surrounding of an own vehicle by an on-vehicle camera and detects an obstacle based on an edge extracted as a feature point in the captured image, for the purpose of avoiding collision with the obstacle or the like (see, for example, Japanese Laid-open Patent Publication No. 2009-025910)

However, there is a problem in the conventional technique described above in that an edge cannot be extracted for an obstacle with a poor feature point such as a wall with no pattern so that it is difficult to detect the obstacle.

SUMMARY

According to an aspect of an embodiment, an obstacle detection apparatus includes an image capturing unit, an estimation unit, and a determination unit. The image capturing unit is provided on a vehicle and captures an image of surroundings of the vehicle. The estimation unit estimates an existence region with an obstacle existing therein in an image captured by the image capturing unit. The determination unit determines presence or absence of the obstacle based on brightness of the existence region.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein:

FIG. 1A and FIG. 1B are diagrams (part 1 and part 2) illustrating an example of a scene envisaged in embodiments.

FIG. 1C is a diagram illustrating a summary of an obstacle detection technique according to a first embodiment.

DESCRIPTION OF EMBODIMENTS

Hereinafter, embodiments of an obstacle detection apparatus and an obstacle detection method disclosed in the present application will be described in detail, with reference to the accompanying drawings. This invention is not limited to embodiments described below.

Hereinafter, summaries of obstacle detection techniques according to the present embodiments will be described by using FIG. 1A to FIG. 1E, and subsequently, obstacle detection apparatuses with these obstacle detection techniques applied thereto will be described by using FIG. 2 to FIG. 8. A first embodiment, a second embodiment, and a third embodiment will be described in descriptions using FIG. 2 to FIG. 4, descriptions using FIG. 5A to FIG. 6, and descriptions using FIG. 7A to FIG. 8, respectively.

Figure 1D:
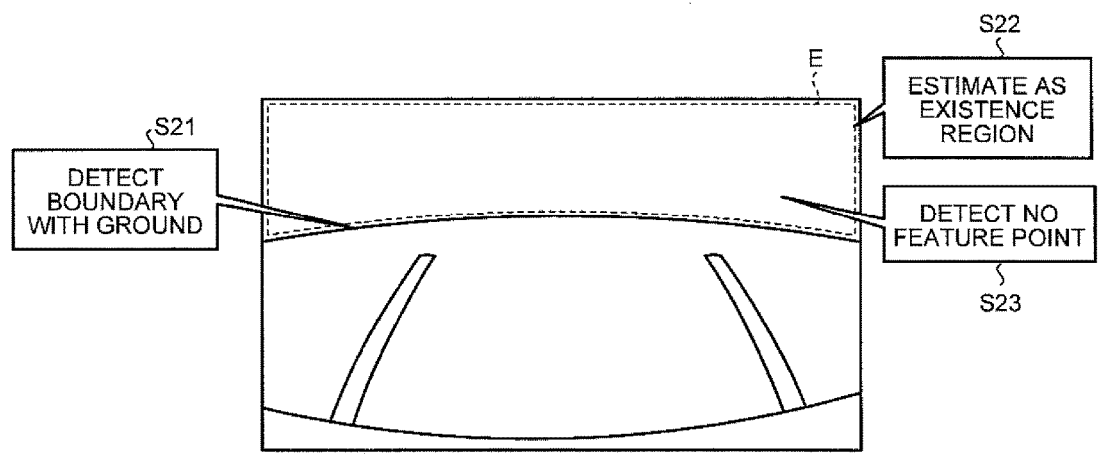
FIG. 1D is a diagram illustrating a summary of an obstacle detection technique according to a second embodiment.

First, the summaries of the obstacle detection techniques according to the present embodiments will be described by using FIG. 1A to FIG. 1E. FIG. 1A and FIG. 1B are diagrams (part 1 and part 2) illustrating an example of a scene envisaged in the present embodiments.

Figure 1E:
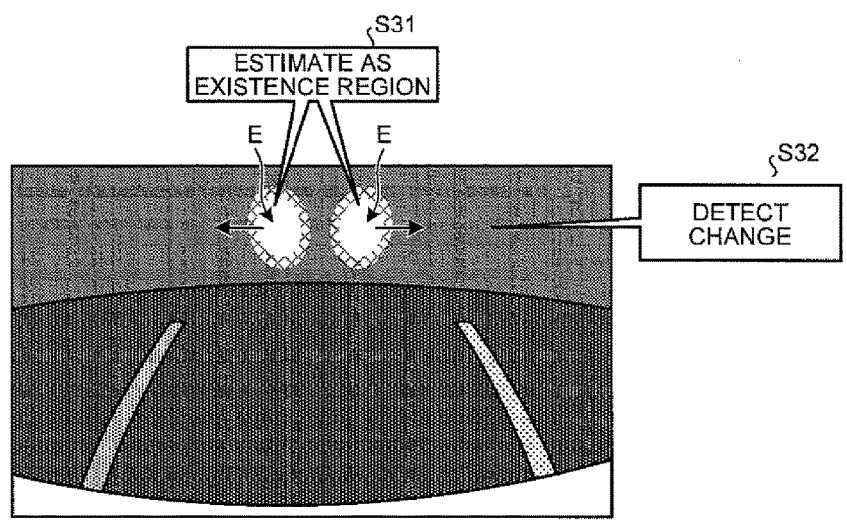
FIG. 1E is a diagram illustrating a summary of an obstacle detection technique according to a third embodiment.

FIG. 1C is a diagram illustrating a summary of an obstacle detection technique according to the first embodiment. FIG. 1D is a diagram illustrating a summary of an obstacle detection technique according to the second embodiment. FIG. 1E is a diagram illustrating a summary of an obstacle detection technique according to the third embodiment.

As illustrated in FIG. 1A, a scene where a vehicle 1 is intended to move backward into a parking space with no car stopper provided in front of a wall 100 is envisaged as an example in the present embodiments. The vehicle 1 is provided with an on-vehicle camera 2 (image capturing unit) for back view.

As illustrated in FIG. 1B, an image captured by the on-vehicle camera 2 is output to a display module (for example, a display device) of an on-vehicle apparatus 3 mounted on the vehicle 1. Herein, the wall 100 has "no pattern" as illustrated in FIG. 1B.

An obstacle detection apparatus 30 according to the embodiment (as described below) determines the wall 100 as an obstacle in such a scene and notifies, for example, a display module 40, of a result of determination thereof. For a publicly known technique of such obstacle detection based on a captured image, for example, detecting a portion with discontinuously changing brightness in a brightness image as an "edge" that could be a "feature point" and determining presence or absence of an obstacle based on such an edge has been known.

However, it is basically difficult to find a portion with a discontinuously changing brightness in the wall 100 with "no pattern" as illustrated in FIG. 1B or the like so that it is difficult to detect an edge per se. Hence, in the present embodiments, an existence region with an obstacle with a poor feature point existing therein in a captured image is estimated by a predetermined technique and presence or absence of an obstacle is determined based on brightness of such an existence region.

For example, in the first embodiment, a region near a vanishing point VP in a captured image, more specifically, a region near a horizontal line HL including the vanishing point VP, is estimated as an existence region E as illustrated in FIG. 1C (step S11).

In the first embodiment, if a brightness distribution of respective pixels of such an existence region E is concentrated within a specific range SR, determination is provided in such a manner that the wall 100 with "no pattern" as an obstacle in the existence region E (step S12). That is, the first embodiment focuses on a point that the brightness distribution as a feature point of the wall 100 with "no pattern" is concentrated within a narrow range such as the specific range SR. Therefore, the specific range SR is set at such a range that the wall 100 with "no pattern" can be detected from the brightness distribution.

In the second embodiment, a boundary with ground is detected based on brightness of respective pixels of a captured image as illustrated in FIG. 1D (step S21). In the second embodiment, a region above such a boundary is estimated as an existence region E (step S22).

In the second embodiment, no feature point present in such an existence region E is detected based on brightness of respective pixels of the existence region E (step S23). Specifically, for example, approximately uniform brightness with a small amount of variation is detected.

In the second embodiment, if no feature point is present in the existence region E, determination is provided in such a manner that the wall 100 with "no pattern" is present as an obstacle in the existence region E. That is, the second embodiment is such that a region other than the ground in the captured image is provided as the existence region E, and if no feature point based on the brightness is present in the existence region E, the wall 100 with "no pattern" is obviously present as an obstacle.

However, in the second embodiment, a feature point of the wall 100 may be detected by extending a dynamic range of, or detecting a color edge in, the existence region E. This matter will be described below, by using FIG. 5B or FIG. 6.

For example, in the third embodiment, a region indicating brightness greater than or equal to a predetermined threshold in a case of night or a dim room is estimated as an existence region E as illustrated in FIG. 1E (step S31).

In the third embodiment, a change of such an existence region E depending on (for example, backward) movement of the vehicle 1 is detected (step S32). For example, FIG. 1E illustrates an example of two existence regions E that moves to left and right and away from each other depending on backward movement of the vehicle 1.

In the third embodiment, if the existence region E moves depending on movement of the vehicle 1, determination is provided in such a manner that the wall 100 with "no pattern" is present as an obstacle in the existence region E. That is, the third embodiment focuses on a point that, if the wall 100 is present at night or in a dim room, a back lamp or the like of the vehicle 1 provides reflection therefrom.

The "change" at step S32 is not only a change of a position in the existence region E but may also be, for example, a change of brightness therein. This matter will be described below, by using FIG. 7B.

Thus, in the present embodiments, an existence region E with an obstacle with a poor feature point present therein is estimated for a captured image, and presence or absence of the obstacle is determined based on brightness of such an existence region E. Therefore, according to the present embodiments, even an obstacle with a poor feature point can be detected.

Hereinafter, the first to third embodiments with the summaries illustrated in FIG. 1C to FIG. 1E will be specifically described sequentially.

(First Embodiment)

Figure 2:
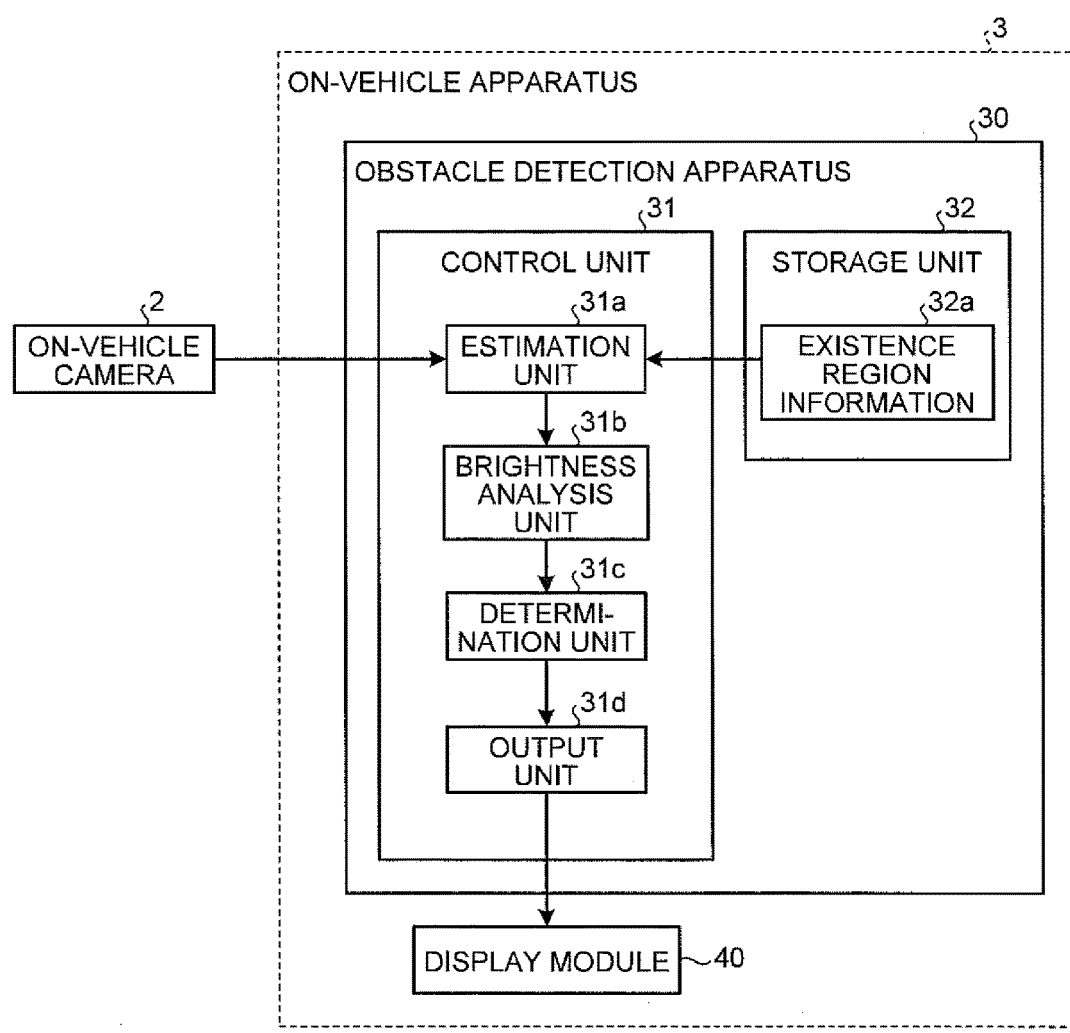
FIG. 2 is a block diagram of an obstacle detection apparatus according to the first embodiment.

FIG. 2 is a block diagram of an obstacle detection apparatus 30 according to the first embodiment. In FIG. 2, only components necessary for explaining a feature of the present embodiment will be illustrated, and illustrations of general components will be omitted.

For example, the obstacle detection apparatus 30 is capable of executing an obstacle detection process that includes the above-mentioned publicly known technique based on an edge or the like, and a process described in the present embodiment is a part of such an obstacle detection process to detect an obstacle with a poor feature point such as the wall 100 with "no pattern". This matter is also similar in the second and third embodiments described below.

As illustrated in FIG. 2, the obstacle detection apparatus 30 is provided, for example, in an on-vehicle apparatus 3. The obstacle detection apparatus 30 may be provided outside the on-vehicle apparatus 3.

The obstacle detection apparatus 30 includes a control unit 31 and a storage unit 32. The control unit 31 is, for example, a Central Processing Unit (CPU) and executes overall control of the obstacle detection apparatus 30.

The control unit 31 includes an estimation unit 31a, a brightness analysis unit 31b, a determination unit 31c, and an output unit 31d. The estimation unit 31a, the brightness analysis unit 31b, the determination unit 31c, and the output unit 31d are realized in software in such a manner that, for example, a variety of (non-illustrated) executable programs that are preliminarily stored in the storage unit 32 are loaded into the control unit 31 and sequentially executed in the control unit 31.

The estimation unit 31a estimates an existence region E based on an image captured by an on-vehicle camera 2 and existence region information 32a. The existence region information 32a is information for estimation of the existence region E, and for example, includes, in the first embodiment, information of a coordinate position and a size of the existence region E near a vanishing point VP as mentioned above. The estimation unit 31a notifies the brightness analysis unit 31b of the estimated existence region E.

The brightness analysis unit 31b analyzes a brightness distribution of respective pixels of the notified existence region E, and notifies the determination unit 31c of an analysis result. The determination unit 31c determines presence or absence of an obstacle based on the notified analysis result, and notifies the output unit 31d of a determination result.

Figure 3A:
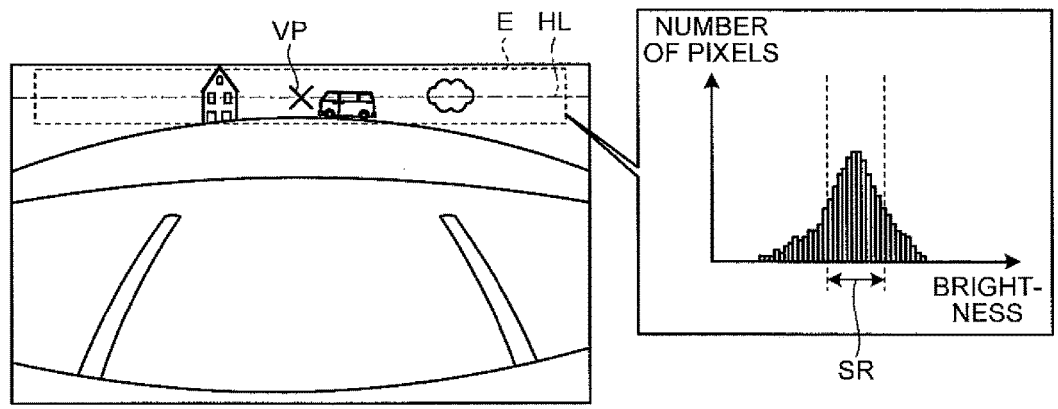
FIG. 3A to FIG. 3O are diagrams (part 1 to part 3) illustrating a determination process of a determination unit according to the first embodiment.
Figure 3B:
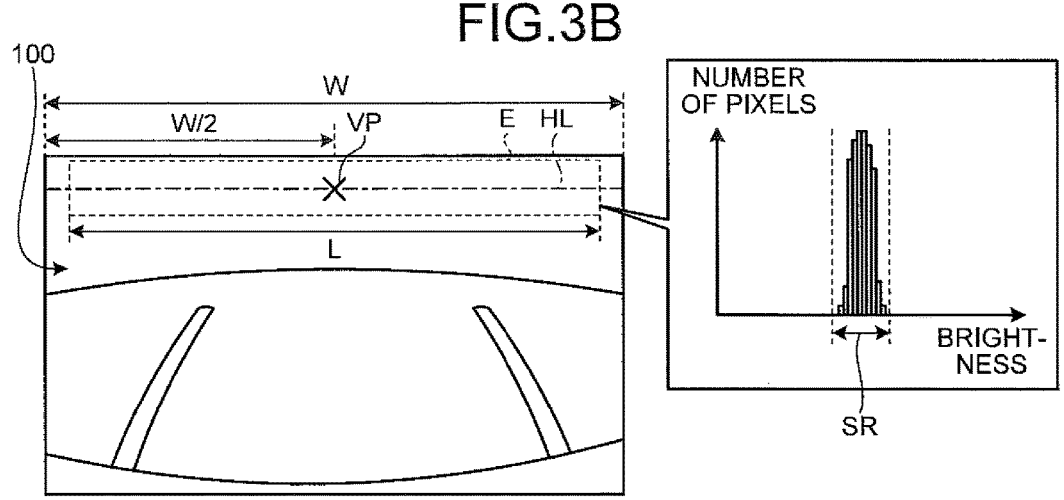
Figure 3C:
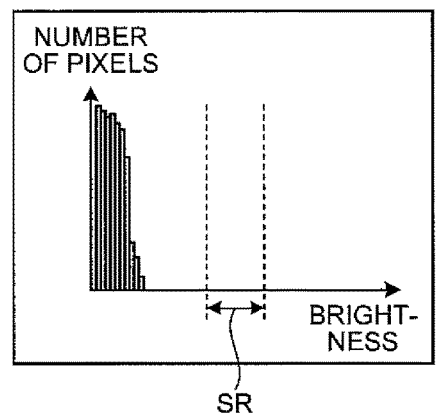

Herein, a determination process of the determination unit 31c according to the first embodiment will be described more specifically. FIG. 3A to FIG. 3C are diagrams (part 1 to part 3) illustrating a determination process of the determination unit 31c according to the first embodiment.

First, as illustrated in FIG. 3A, for example, the wall 100 with no pattern is not present as an obstacle behind the vehicle 1. In such a case, a variety of objects such as a building, a car, and a tree may be present in an existence region E that is a region near a horizontal line HL that includes a vanishing point VP, and a brightness distribution of the existence region frequently covers a wide range exceeding a specific range SR.

On the other hand, as illustrated in FIG. 3B, in a case where the wall 100 with no pattern is present as an obstacle behind the vehicle 1, most of the existence region E has nearly identical brightness, and hence, brightness distribution of the existence region E is concentrated within the specific range SR.

Therefore, the determination unit 31c determines that the wall 100 with no pattern is present as an obstacle in a case where the brightness distribution is concentrated within the specific range SR, or determines that the wall 100 with no pattern is absent as an obstacle in a case where the brightness distribution covers a wide range exceeding the specific range SR.

Herein, as illustrated in FIG. 3B, it is preferable to ensure that a size L of the existence region E in a horizontal direction is greater than or equal to a half "W/2" of a size of a captured image in a lateral direction. This is because it is sufficient to detect the wall 100 as an obstacle only in a case where the vehicle 1 approaches the wall 100. The size L in the horizontal direction is ensured, and thereby, the wall at a long distance can be prevented from being erroneously detected in a case where the size L in the horizontal direction is not ensured.

Furthermore, as illustrated in FIG. 3C, in a case where brightness distribution of the existence region E deviates from the specific range SR toward a lower side, the determination unit 31c determines night and determines that the wall is absent as an obstacle. This is because the brightness distribution should be shifted to a higher side due to a back lamp or a tail lamp if the wall 100 approaches.

By returning to the illustration of FIG. 2, the output unit 31d will be described. The output unit 31d draws in a format displayable on the display module 40, and outputs to the display module 40, a determination result from the determination unit 31c.

Figure 4:
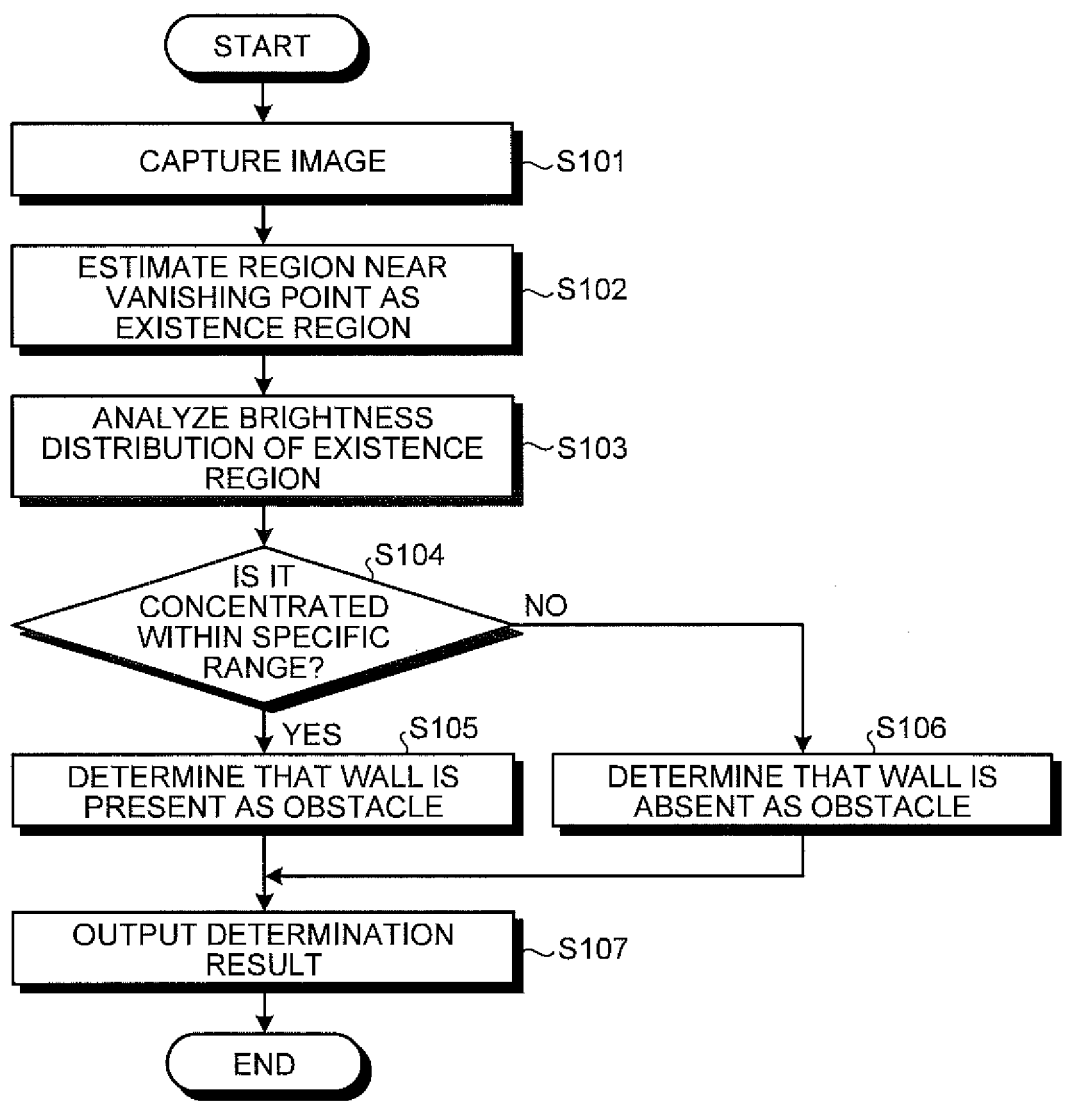
FIG. 4 is a flowchart illustrating process steps to be executed by the obstacle detection apparatus according to the first embodiment.

Next, process steps to be executed by the obstacle detection apparatus 30 according to the first embodiment will be described by using FIG. 4. FIG. 4 is a flowchart illustrating process steps to be executed by the obstacle detection apparatus 30 according to the first embodiment.

Process steps illustrated in FIG. 4 are a part for detecting an obstacle with a poor feature point (the wall 100 with no pattern or the like) in an obstacle detection process that includes a publicly known technique as described above. This matter is also similar in a case of the second and third embodiments illustrated in FIG. 6 and FIG. 8 below.

As illustrated in FIG. 4, first, the on-vehicle camera 2 captures an image of surroundings of the vehicle 1 (step S101). Then, the estimation unit 31a estimates a region near a vanishing point VP as an existence region E (step S102).

Subsequently, the brightness analysis unit 31b analyzes brightness distribution of the existence region E (step S103). Then, the determination unit 31c determines whether or not such brightness distribution is concentrated within a specific range SR (step S104).

Herein, if the brightness distribution is concentrated within the specific range SR (step S104, Yes), the determination unit 31c determines that the wall 100 is present as an obstacle (step S105). If the brightness distribution is not concentrated within the specific range SR (step S104, No), the determination unit 31c determines that the wall 100 is absent as an obstacle (step S106).

Then, the output unit 31d outputs a determination result to the display module 40 (step S107) and ends such a process.

As described above, an obstacle detection apparatus according to the first embodiment includes an on-vehicle camera (image capturing unit), an estimation unit, and a determination unit. The on-vehicle camera is provided on a vehicle and captures an image of surroundings of the vehicle. The estimation unit estimates an existence region with an obstacle present therein in an image captured by the on-vehicle camera. The determination unit determines presence or absence of the obstacle based on brightness of the existence region.

The estimation unit estimates a region near a vanishing point in the captured image as an existence region. The determination unit determines that an obstacle is present in the existence region if brightness distribution of respective pixels of the existence region is concentrated within a specific range.

Therefore, an obstacle detection apparatus according to the first embodiment can even detect an obstacle with a poor feature point.

(Second Embodiment)

Figure 5A:
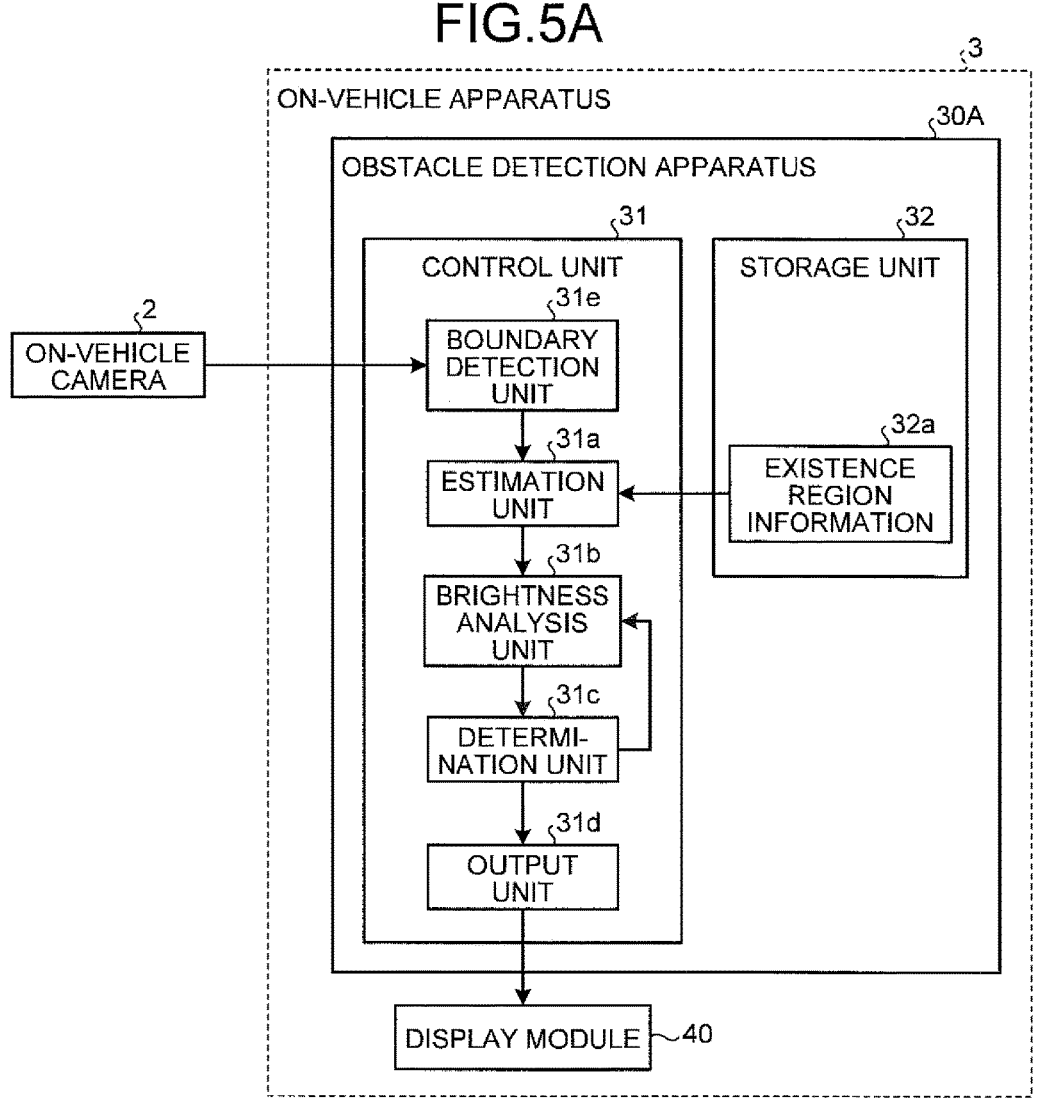
FIG. 5A is a block diagram of an obstacle detection apparatus according to the second embodiment.
Figure 5B:
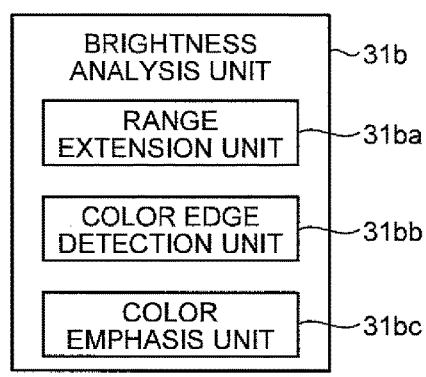
FIG. 5B is a block diagram of a brightness analysis unit according to the second embodiment.

Next, a configuration of an obstacle detection apparatus 30A according to the second embodiment will be described. FIG. 5A is a block diagram of an obstacle detection apparatus 30A according to the second embodiment. FIG. 5B is a block diagram of a brightness analysis unit 31b according to the second embodiment.

In the second embodiment, a component different from that of the first embodiment will mainly be described while descriptions of the components having been described already will be simplified or omitted.

The obstacle detection apparatus 30A according to the second embodiment is different from the first embodiment in that a boundary detection unit 31e is further included therein. The boundary detection unit 31e detects a boundary between ground and something other than the ground in a captured image based on brightness of respective pixels of the captured image. The boundary detection unit 31e notifies an estimation unit 31a of the detected boundary. For an example of detection of a boundary between ground and something other than the ground, for example, a portion where a part with a brightness change between adjacent pixels being nearly identical extends substantially linearly may be detected as a boundary.

The estimation unit 31a estimates a region above the notified boundary as an existence region E and notifies a brightness analysis unit 31b of the estimated existence region E. Information of a region above the notified boundary being an existence region E is included in existence region information 32a according to the second embodiment.

The brightness analysis unit 31b analyzes brightness of respective pixels of the existence region E and notifies a determination unit 31c of an analysis result. As illustrated in FIG. 5B, the brightness analysis unit 31b according to the second embodiment further includes a range extension unit 31ba, a color edge detection unit 31bb, and a color emphasis unit 31bc.

The range extension unit 31ba extends a dynamic range of respective pixels of the existence region E, and corrects, for example, so-called "blown out highlights" or "blocked up shadows" or the like of respective pixels of the existence region E, so that a slight pattern or irregularity in the existence region E is reproduced and edge detection is facilitated.

The color edge detection unit 31*bb* detects a color edge based on a color difference between respective pixels of the existence region E. The color emphasis unit 31*bc* executed a color emphasis process for appropriately increasing a range of color saturation depending on detection of a color edge by the color edge detection unit 31*bb*.

The brightness analysis unit 31*b* according to the second embodiment can notify the determination unit 31*c* of an analysis result of the existence region E with a process of at least one of the range extension unit 31*ba*, the color edge detection unit 31*bb*, and the color emphasis unit 31*bc* having been reflected thereon.

The determination unit 31*c* determines that no obstacle is present in a case where edge detection cannot be executed due to no feature point in the existence region E, that is, substantially uniform brightness (small brightness dispersion). The determination unit 31*c* determines that the wall 100 is present as an obstacle if an edge is detected in the existence region E with a dynamic range extended by the range extension unit 31*ba*.

The determination unit 31*c* determines that the wall 100 is present as an obstacle if a color edge is detected in the existence region E by the color edge detection unit 31*bb*. The determination unit 31*c* exchanges information with the brightness analysis unit 31*b* every time based on a determination result.

Figure 6:
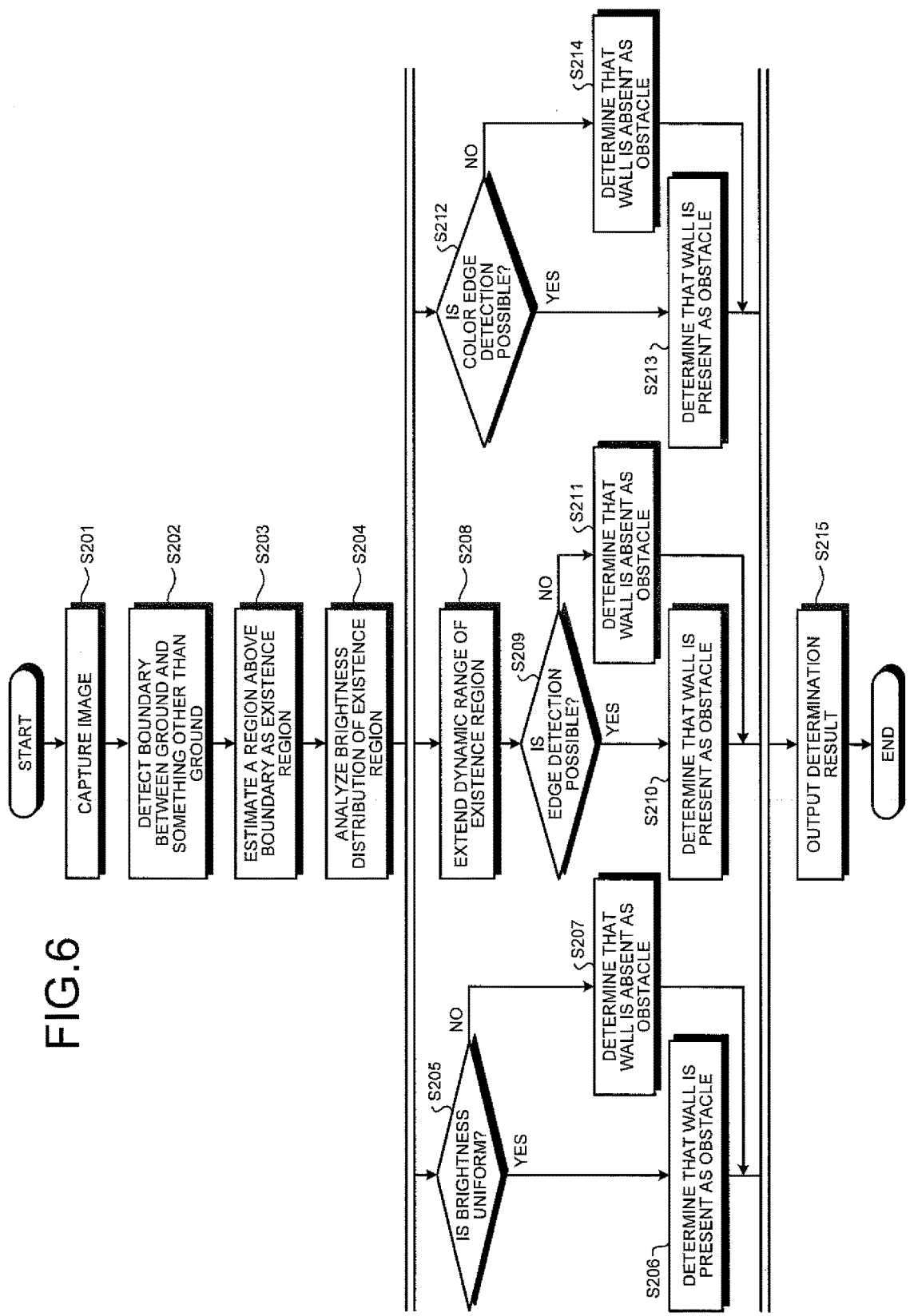
FIG. 6 is a flowchart illustrating process steps to be executed by the obstacle detection apparatus according to the second embodiment.

Next, process steps to be executed by the obstacle detection apparatus 30A according to the second embodiment will be described by using FIG. 6. FIG. 6 is a flowchart illustrating process steps to be executed by the obstacle detection apparatus 30A according to the second embodiment.

As illustrated in FIG. 6, first, the on-vehicle camera 2 captures an image of surroundings of the vehicle 1 (step S201). Then, the boundary detection unit 31*e* detects a boundary between ground and something other than the ground based on brightness of the captured image (step S202).

Then, the estimation unit 31*a* estimates a region above the detected boundary as an existence region F (step S203), and the brightness analysis unit 31*b* analyzes brightness of the existence region E (step S204).

Subsequent steps S205 to S207, steps S208 to S211, and steps S212 to S214 are executed in parallel. For these three patterns of process steps, one of them may be executed or a plurality of them may be executed.

For a first pattern, the determination unit 31*c* determines whether or not the brightness is substantially uniform (dispersion of the brightness is small) (step S205).

If the brightness is substantially uniform (step S205, Yes), the determination unit 31*c* determines that the wall 100 is present as an obstacle (step S206). Whether or not the brightness is substantially uniform may depend on a predetermined determination condition based on a predetermined value of dispersion thereof or the like.

If a determination condition at step S205 is not satisfied (step S205, No), the determination unit 31*c* determines that the wall 100 is absent as an obstacle (step S207).

For a second pattern, the brightness analysis unit 31*b* (range extension unit 31*ba*) extends a dynamic range of the existence region E (step S208). Then, the determination unit 31*c* determines whether or not edge detection can be executed in the existence region E with the extended dynamic range (step S209).

If an edge is detected (step S209, Yes), the determination unit 31*c* determines that the wall 100 is present as an obstacle (step S210). If a determination condition at step S209 is not satisfied (step S209, No), the determination unit 31*c* determines that the wall 100 is absent as an obstacle (step S211).

For a third pattern, the brightness analysis unit 31*b* (color edge detection unit 31*bb*) detects a color edge in the existence region E. Then, the determination unit 31*c* determines whether or not color edge detection can be executed in the existence region E (step S212).

If a color edge is detected (step S212, Yes), the determination unit 31*c* determines that the wall 100 is present as an obstacle (step S213). If a determination condition at step S212 is not satisfied (step S212, No), the determination unit 31*c* determines that the wall 100 is absent as an obstacle (step S214).

Then, the output unit 31*d* outputs a determination result in each pattern described above to a display module 40 (step S215) and ends such a process. FIG. 6 illustrates that steps S205 to S207, steps S208 to S211, and steps S212 to S214 are provided in a parallel relationship, and are not limited thereto.

For example, steps S202 to S207 and S215, steps S202 to S204, S208 to S211, and S215, and steps S202 to S204 and S212 to S215 may be provided in a parallel relationship.

As described above, an obstacle detection apparatus according to the second embodiment includes an on-vehicle camera (image capturing unit), an estimation unit, and a determination unit. The on-vehicle camera is provided on a vehicle and captures an image of surroundings of the vehicle. The estimation unit estimates an existence region with an obstacle present therein in an image captured by the on-vehicle camera. The determination unit determines presence or absence of the obstacle based on brightness of the existence region.

The obstacle detection apparatus according to the second embodiment further includes a boundary detection unit. The boundary detection unit detects a boundary between ground and something other than the ground in the captured image based on brightness of respective pixels of the captured image. The estimation unit estimates a region above such a boundary as an existence region in a case where the boundary is detected by the boundary detection unit. The determination unit determines that an obstacle is present in the existence region if brightness of respective pixels of the estimated existence region is substantially uniform.

Therefore, the obstacle detection apparatus according to the second embodiment can even detect an obstacle with a poor feature point.

(Third Embodiment)

Next, a configuration of an obstacle detection apparatus 30B according to the third embodiment will be described. A block diagram of the obstacle detection apparatus 30B is similar to the block diagram of the obstacle detection apparatus 30 according to the first embodiment as having already been illustrated in FIG. 2, and hence, will be omitted.

Therefore, the block diagram of FIG. 2 will herein be referred to, and only reference numeral "30" in FIG. 2 will be read as reference numeral "30B". In the third embodiment, a component different from that of the first embodiment will mainly be described while descriptions of the components having been described already will be simplified or omitted.

An estimation unit 31*a* of the obstacle detection apparatus 30B according to the third embodiment estimates a region indicating brightness greater than or equal to a predetermined threshold in a captured image as an existence region E and notifies a brightness analysis unit 31*b* of the estimated existence region E. The predetermined threshold is derived and predetermined from an experiment with night environment or the like being taken into consideration or the like, and included in existence region information 32a according to the third embodiment.

A brightness analysis unit 31b analyzes a change of the existence region E including a position of the existence region E or brightness of respective pixels thereof, and notifies a determination unit 31c of an analysis result. The determination unit 31c determines that the wall 100 is present as an obstacle if the existence region E moves depending on movement of the vehicle 1.

Figure 7A:
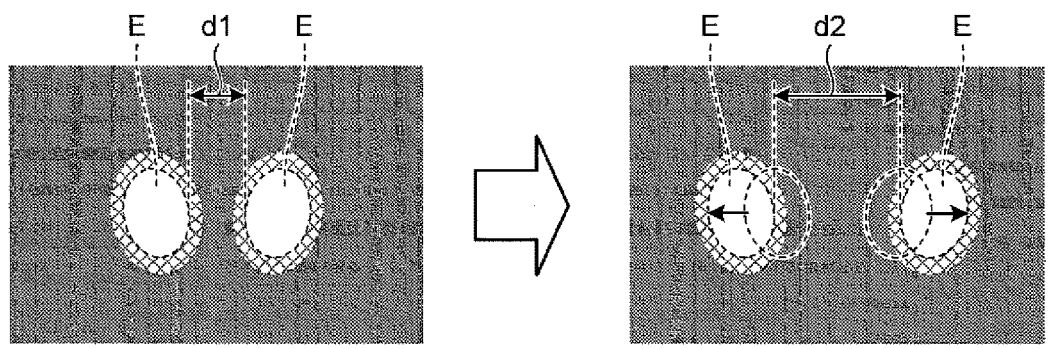
FIG. 7A and FIG. 7B are diagrams (part 1 and part 2) illustrating a determination process of a determination unit according to the third embodiment.
Figure 7B:
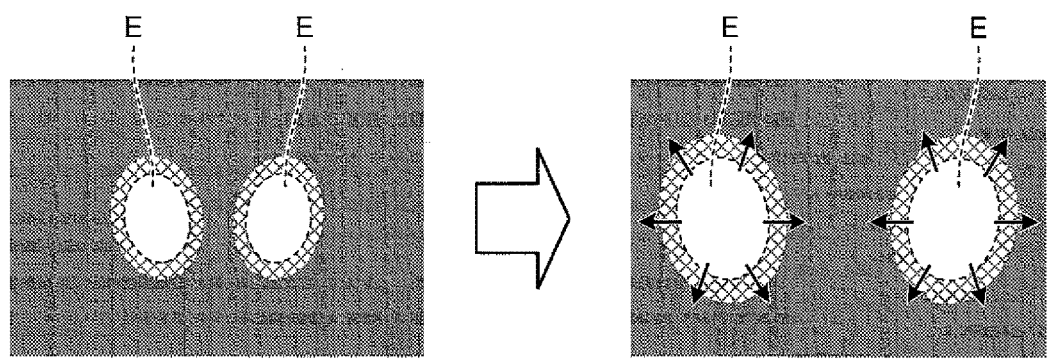

Herein, a determination process of the determination unit 31c according to the third embodiment will be described more specifically. FIG. 7A and FIG. 7B are diagrams (part 1 and part 2) illustrating a determination process of the determination unit 31c according to the third embodiment.

First, as illustrated in a left figure of FIG. 7A, for example, two existence regions E with shapes similar to each other are estimated by the estimation unit 31a. A distance between these existence regions E is denoted by d1.

Then, the vehicle 1 moves backward, and accordingly, as illustrated in a right figure of FIG. 7A, the two existence regions E moves to left and right and away from each other, wherein the brightness analysis unit 31b notifies the determination unit 31c of a change from the distance d1 to a greater distance d2 as an analysis result.

In such a case, the determination unit 31c determines that the wall 100 is present as an obstacle. That is, in a case where the vehicle 1 moves backward at night or in a dim room, a back lamp or a tail lamp provides reflection from the wall 100 and such reflection regions (existence regions E) moves to left and right as the vehicle 1 approaches the wall 100.

In such a case, movement of the existence regions may include extension of the existence regions E. That is, as illustrated in a left figure to a right figure of FIG. 73, the determination unit 31c may determine that the wall 100 is present as an obstacle in a case where both of the two existence regions E are extended depending on movement of the vehicle 1.

In this case, the brightness analysis unit 31b may analyze a change of brightness of the two existence regions E and add a condition that the brightness of both existence regions E increases. That is, in a case where the estimation unit 31a estimates two existence regions E with shapes similar to each other, the determination unit 31c determines that the wall 100 is present as an obstacle if both of the two existence regions E are extended depending on movement of the vehicle 1 and brightness of both of them increases.

Thus, not only positions of the existence regions E but also a change of brightness thereof is taken into consideration, and thereby, it is possible to detect an obstacle with a poor feature point accurately. Although an example of the two existence regions E has been provided herein, the number of the existence regions E is not limited.

Figure 8:
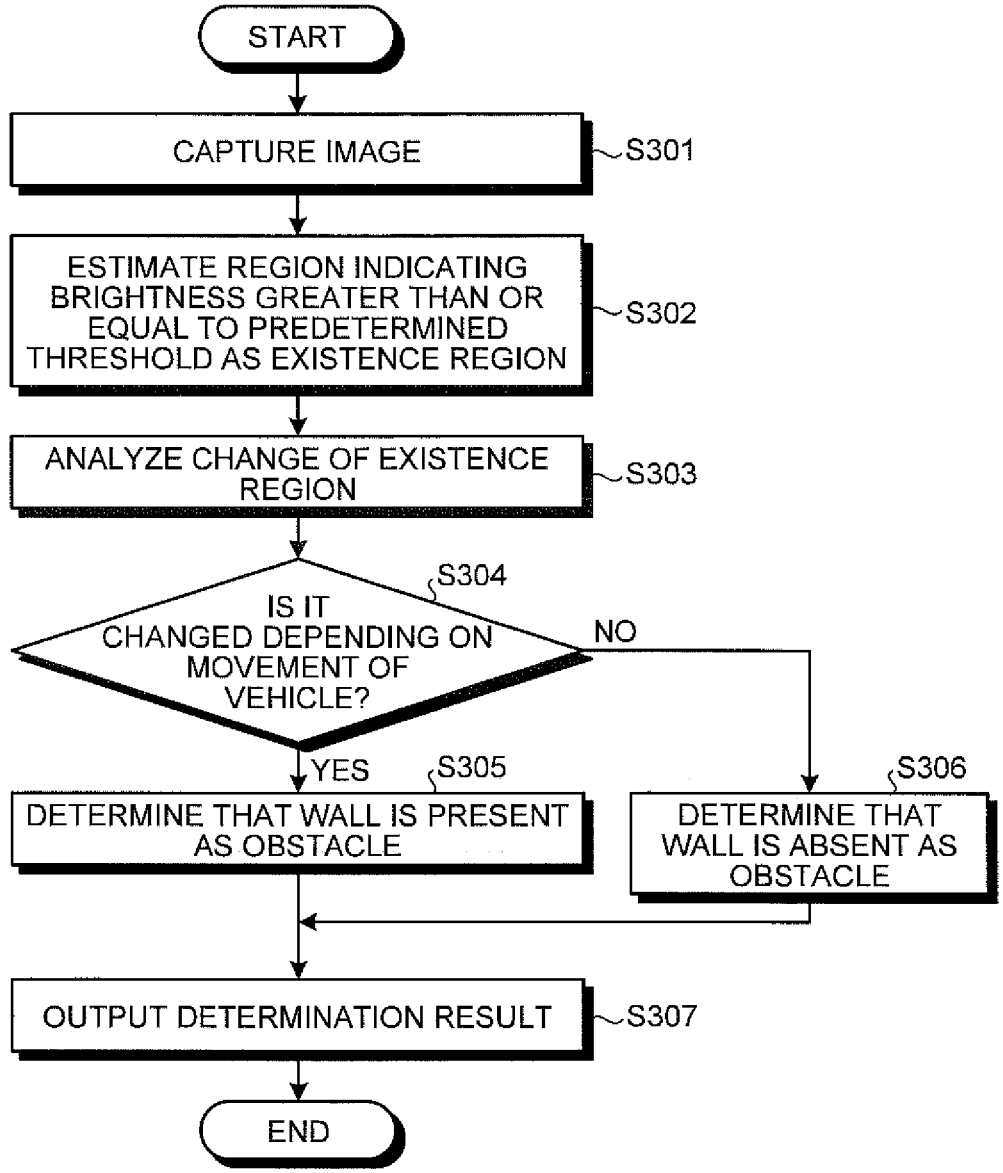
FIG. 8 is a flowchart illustrating process steps to be executed by an obstacle detection apparatus according to the third embodiment.

Next, process steps to be executed by the obstacle detection apparatus 30B according to the third embodiment will be described by using FIG. 8. FIG. 8 is a flowchart illustrating process steps to be executed by the obstacle detection apparatus 30B according to the third embodiment.

As illustrated in FIG. 8, first, the on-vehicle camera 2 captures an image of surroundings of the vehicle 1 (step S301). Then, the estimation unit 31a estimates a region indicting brightness greater than or equal to a predetermined threshold as an existence region E (step S302).

Subsequently, the brightness analysis unit 31b analyzes a change of the existence region E (step S303). Such a change includes a change of a position and brightness of the existence region E as described above. Then, the determination unit 31c determines whether or not the existence region E is changed depending on movement of the vehicle 1 (step S304).

If the existence region E is changed (for example, moved) depending on movement of the vehicle 1 (step S304, Yes), the determination unit 31c determines that the wall 100 is present as an obstacle (step S305). If a determination condition at step S304 is not satisfied (step S304, No), the determination unit 31c determines that the wall 100 is absent as an obstacle (step S306).

Then, the output unit 31d outputs a determination result to a display module 40 (step S307) and ends such a process.

As described above, an obstacle detection apparatus according to the third embodiment includes an on-vehicle camera (image capturing unit), an estimation unit, and a determination unit. The on-vehicle camera is provided on a vehicle and captures an image of surroundings of the vehicle. The estimation unit estimates an existence region with an obstacle present therein in an image captured by the on-vehicle camera. The determination unit determines presence or absence of an obstacle based on brightness of the existence region.

The estimation unit estimates a region indicating brightness greater than or equal to a predetermined threshold in the captured image as an existence region. The determination unit determines that an obstacle is present in the existence region if the existence region moves depending on movement of the vehicle.

Therefore, the obstacle detection apparatus according to the third embodiment can even detect an obstacle with a poor feature point at night or in a dim room.

Although a case where the on-vehicle camera is provided for back view is provided as an example in each embodiment described above, the on-vehicle camera is not limited thereto. That is, each embodiment described above is applicable even when the on-vehicle camera is provided for side view or front view.

For example, even when the on-vehicle camera is provided for front view, accurate obstacle detection is possible in a case where an obstacle with a poor feature point is present at a position of a blind spat for a driver, or the like.

Although a wall with no pattern is provided as an example in each embodiment described above, the wall with no pattern is merely an example of an obstacle with a poor feature point and such an obstacle is, of course, not limited to a wall.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An obstacle detection apparatus that detects an obstacle of which edges are difficult to be detected, the apparatus comprising: a processor programmed to: estimate, as an existence region, in which an obstacle exists, in an image captured by an image capturing unit, two regions with shapes similar to each other that indicate brightness greater than or equal to a predetermined threshold in the captured image, the image capturing unit being provided on a vehicle to capture images of surroundings of the vehicle; and in response to the two regions with shapes similar to each other that indicate brightness greater than or equal to the predetermined threshold in the captured image being estimated as the existence region, determine that the obstacle is present in the existence region in a case where the two regions are extended and brightness of both of the two regions are increased, depending on movement of the vehicle.

2. An obstacle detection method for detecting an obstacle of which edges are difficult to be detected, the method comprising: capturing an image of surroundings of a vehicle; estimating, as an existence region, in which an obstacle exists, in the captured image, two regions with shapes similar to each other that indicate brightness greater than or equal to a predetermined threshold in the captured image; and in response to the two regions with shapes similar to each other that indicate brightness greater than or equal to the predetermined threshold in the captured image being estimated as the existence region, determining that the obstacle is present in the existence region in a case where the two regions are extended and brightness of both of the two regions are increased, depending on movement of the vehicle.

\* \* \* \* \*